United States Patent [19]

Matsuda et al.

[11] Patent Number: 4,939,725
[45] Date of Patent: Jul. 3, 1990

[54] MULTIPLEX TRANSMISSION SYSTEM

[75] Inventors: Yutaka Matsuda, Hiratsuka; Teruhisa Inoue, Ichikawa; Yusaku Himono, Tokyo; Yuichi Ito; Osamu Michihira, both of Hiroshima, all of Japan

[73] Assignees: Furukawa Electric Co., Ltd., Tokyo; Mazda Motor Corp., Hiroshima, both of Japan

[21] Appl. No.: 276,222

[22] Filed: Nov. 23, 1988

[30] Foreign Application Priority Data

Nov. 30, 1987 [JP] Japan .................. 62-302424

[51] Int. Cl.[5] ................................. H04J 3/26
[52] U.S. Cl. ................ 370/85.3; 370/110.1; 370/99
[58] Field of Search .............. 370/99, 110.1, 85.1, 370/85.2, 85.3, 94.1

[56] References Cited

U.S. PATENT DOCUMENTS

3,207,851 9/1965 Fukinuki .................. 370/110.1
3,743,789 7/1973 Krupp ...................... 370/110.1
4,706,247 11/1987 Yoshioka .................. 370/99

Primary Examiner—Douglas W. Olms
Attorney, Agent, or Firm—Frishauf, Holtz, Goodman & Woodward

[57] ABSTRACT

A multiplex transmission system, in which a plurality of nodes are coupled together through a transmission path, and a node as a transmission node transmits a frame of data including a data area containing transmission data, to other nodes as reception nodes through the transmission path. The frame of data includes a data valid/invalid area having the same bit length as the data area and indicating, bit by bit, the validness/invalidness of the data carried by the corresponding bits in the data area. The system need not be modified depending on the model and grade of vehicles, and can be used widely and applied to various options by the use of a signal allocation system common to different models and grades of vehicles. Those bits in the data area which correspond to the bits in the data valid/invalid area indicative of data invalidness may have values thereof set to a fixed value, so that the reception node judges the transmission node to be defective when a bit of the data valid/invalid area of the received frame and the corresponding bit of the data area of the received frame make a combination of specific values.

8 Claims, 9 Drawing Sheets

FIG. 5(A) (PRIOR ART)
FRAME FROM COMBINATION SWITCH MULTIPLEX NODE CS (MODEL A)

FIG. 5(B) (PRIOR ART)
FRAME FROM COMBINATION SWITCH MULTIPLEX NODE CS (MODEL B)

FIG. 5(C) (PRIOR ART)
FRAME FROM CLUSTER SWITCH MULTIPLEX NODE CN (MODEL B)

FIG. 7(A)

FRAME FROM COMBINATION SWITCH MULTIPLEX NODE CS (MODEL A)

FIG. 7(B)

FRAME FROM COMBINATION SWITCH MULTIPLEX NODE CS (MODEL B)

FIG. 7(C)

FRAME FROM CLUSTER SWITCH MULTIPLEX NODE CN (MODEL B)

MULTIPLEX TRANSMISSION SYSTEM

BACKGROUND OF THE INVENTION

The present invention relates to a multiplex transmission system using a CSMA/CD (Carrier Sense Multiple Access/Collision Detection) transmission system, and more particularly, to a frame format used in the multiplex transmission system.

Figure 1:
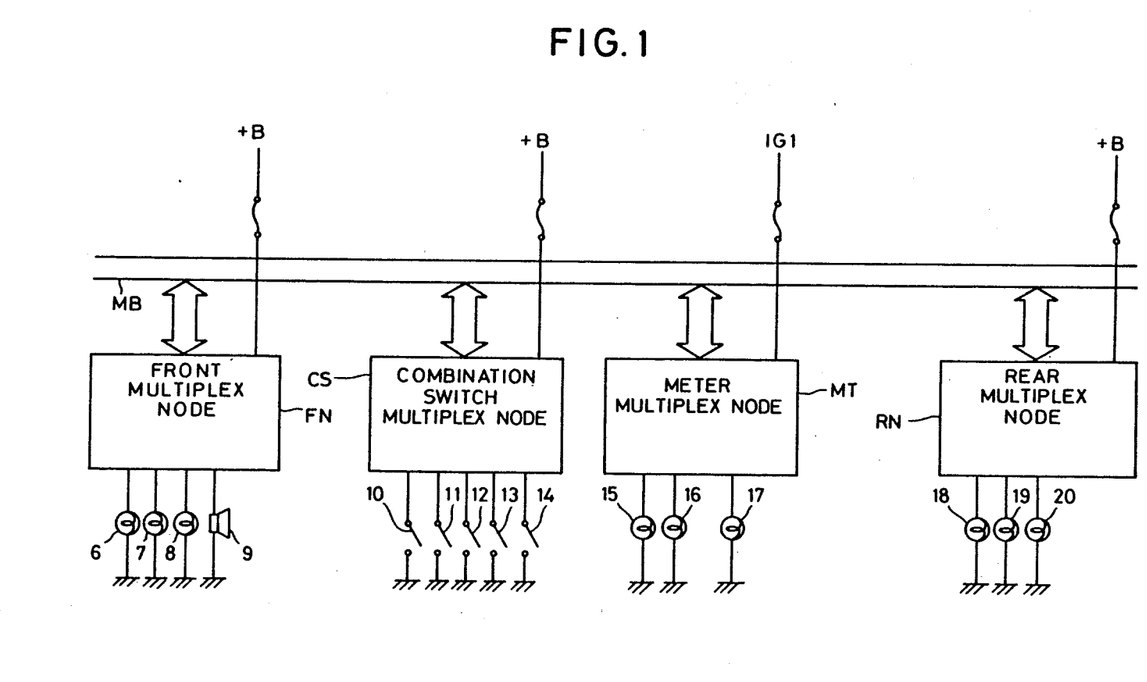
FIG. 1 is a block diagram schematically illustrating the structure of a prior art multiplex transmission system for vehicles, using a CSMA/CD transmission system.

There has been proposed a distributed network type multiplex transmission system using a CSMA/CD transmission system, wherein a plurality of multiplex nodes are coupled together through a multiplex transmission path, data is transmitted in units of frame each including a destination address from any one of the nodes, and when the node designated by the destination address receives the data properly, it returns a reception acknowledgment signal upon receiving the frame properly. FIG. 1 schematically shows the structure of a multiplex transmission system for vehicles which uses the CSMA/CD transmission system. As illustrated, a plurality of multiplex nodes comprising, for example, a front multiplex node FN, a combination switch multiplex node CS, a meter multiplex node MT, and a rear multiplex node RN, are coupled together through a multiplex transmission path (bus) MB composed, for example, of a twisted pair type wire.

The front multiplex node FN is coupled to a front turn-right signal lamp 6, a front turn-left signal lamp 7, a front small lamp 8, and a horn 9. The combination switch multiplex node CS is coupled to a turn-right switch 10, a turn-left switch 11, a small lamp switch 12, a horn switch 13, and a head-lamp high beam switch 14. The meter multiplex node MT is coupled to a turn-right indicator 15, a turn-left indicator 16, and a head-lamp high beam indicator 17. The rear multiplex node RN is coupled to a rear turn-right signal lamp 18, a rear turn-left signal lamp 19, and a tail lamp 20 (which is turned on when the small lamp switch 12 is on).

Figure 2:
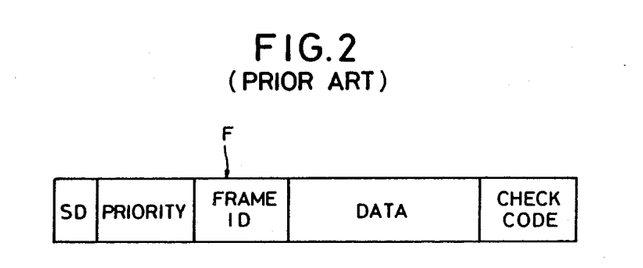
FIG. 2 is a diagram illustrating a frame format used in a conventional multiplex transmission system.

In this multiplex transmission system for vehicles, vehicle driving information is transmitted in units of frame F each having the format as shown in FIG. 2. The frame F includes an SD (Starting Delimiter) code, a priority code, a frame ID code, data, and a check code.

The SD code is a specific code indicating the start of the frame F. The reception-side multiplex node recognizes the start of the frame F upon receiving the SD code. The priority code is a code for priority control, which serves to indicate the priority of signals to be transmitted when a plurality of multiplex nodes concurrently transmit data and accordingly the signals therefrom collide with one another. When a plurality of data collide with one another, that with greater priority is transmitted first. The frame ID code is a code for indicating the type of the frame with which it is associated. More specifically, it indicates what data is assigned to a respective bit of the data area, that is, what combination of data is contained in the data area. The reception multiplex node recognizes the content of the data in the data area of the transmitted frame by means of the frame ID code. In the data area is written, bit by bit, the on/off data of the head lamp, turn-right lamp, turn-left lamp, horn, small lamp, head-lamp high beam switch, head-lamp low beam switch, etc. The check code (error detection code) is transmitted following the data. The reception multiplex node recognizes the end of the frame by detecting this code. Moreover, in order to ensure the data security, each reception node judges whether or not the content of the received frame is correct by means of the check code, and if the transmitted data is correct, the reception node sends its local address, as a reception acknowledgment signal (ACK signal), onto the transmission path MB upon passage of a certain time within a predetermined period of time. The multiplex node which has transmitted the frame F receives the ACK signals, so that it recognizes that the receiving side properly received the data. When the data is not properly received by the receiving side (a data error is detected by means of the check code), or a framing error occurs (the data actually transmitted is shorter or longer than is designated by the data length), the receiving side returns no ACK signal. If the transmission side does not receive the expected ACK signal within the predetermined period of time after the frame transmission, it starts retransmitting the frame F.

Figure 3:
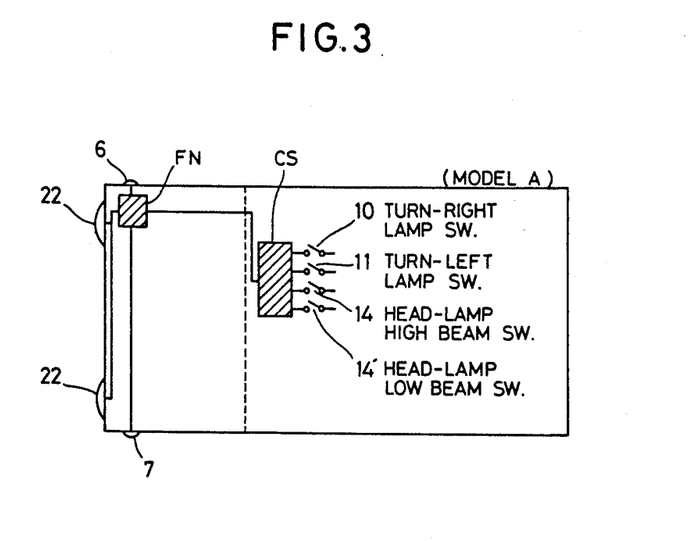
FIGS. 3 and 4 are block diagrams each showing an example of the arrangement of multiplex nodes in a vehicle.
Figure 5A:
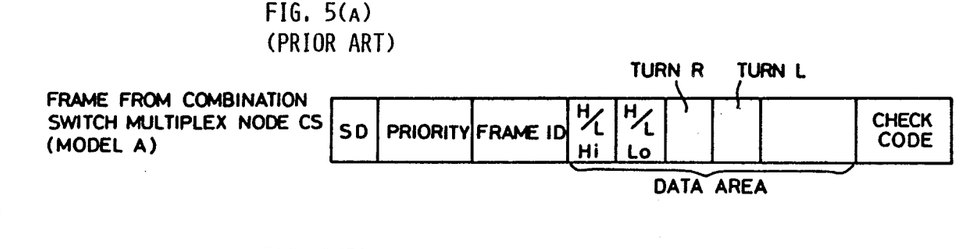
FIGS. 5(a), 5(b) and 5(c) are diagrams illustrating in detail the frame format shown in FIG. 2.

Motor vehicles include a variety of models and, moreover, even vehicles of the same model can be classified into several grades or classes. Thus, the multiplex transmission systems for vehicles usually differ in system configuration from one model to another. Consequently, the assignment of data in the transmission frame varies depending on the model and grade of vehicles in which the frame is to be used. For example, as shown in FIG. 3, a vehicle of model A has head-lamp switches and turn signal lamp switches located adjacent to one another. In this model, therefore, data on these switches can be input collectively to a multiplex node if the node is situated near the switches. Therefore, the combination switch multiplex node CS is provided with the turn-right switch 10, turn-left switch 11, head-lamp high beam (Hi) switch 14, and head-lamp low beam (Lo) switch 14', and the front multiplex node FN is situated on one side of the vehicle so as to be close to the left- or right-side lamps. The on/off signals of the front turn signal lamps 6 and 7 and the high- or low-beam signal of the head lamps 22 are transmitted from the combination switch multiplex node CS to the front multiplex node FN in accordance with the frame format shown in FIG. 5(a). In the example of FIG. 5(a), the head-lamp high beam signal, head-lamp low beam signal, turn-right signal and turn-left signal are assigned respectively to the zeroth, first, second and third bits in the data area of a single frame. Upon receiving this frame, the front multiplex node FN causes the front turn signal lamps 6 and 7 and the head lamps 22 to operate in accordance with the frame data.

Figure 4:
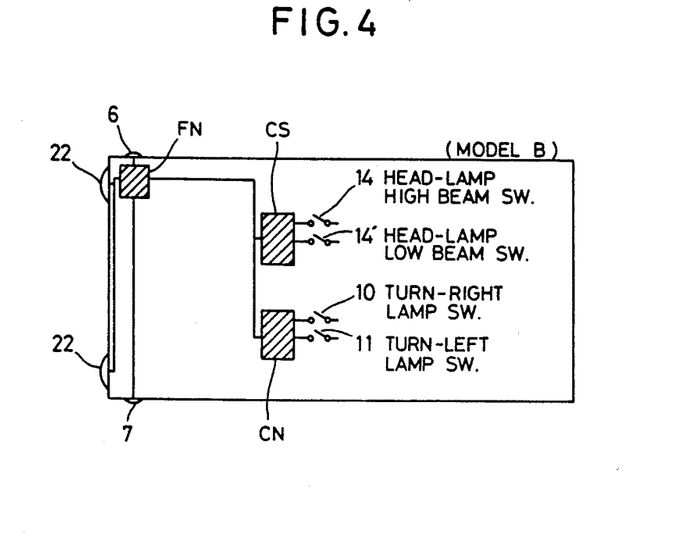
Figure 5B:
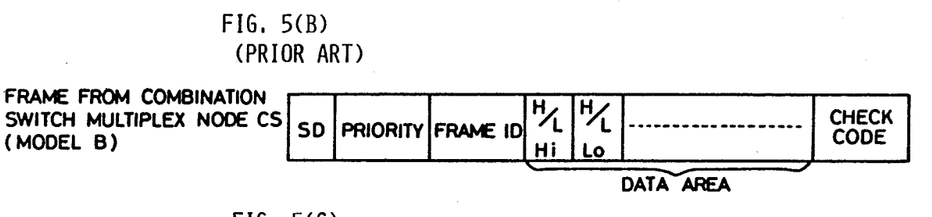
Figure 5C:
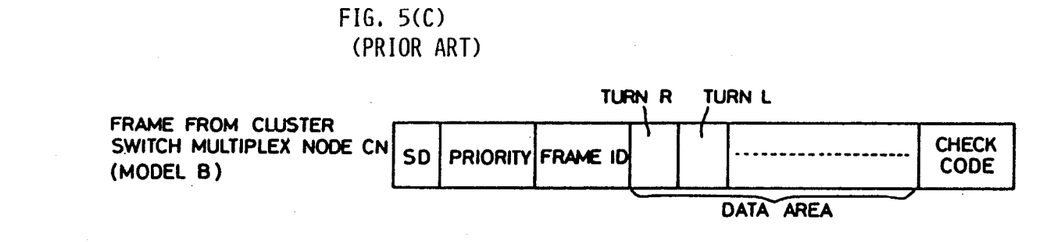

On the other hand, in the case of another vehicle model B, it is desirable to separate the signal of the head lamps from the signals of the turn signal lamps, with their corresponding switches connected to different multiplex nodes, in view of the operation of the multiplex transmission system. Therefore, as shown in FIG. 4, the high beam switch 14 and the low beam switch 14' of the head lamps 22 are provided in the combination switch multiplex node CS, while the turn-right switch 10 and the turn-left switch 11 are provided in a cluster switch multiplex node CN arranged separately. Thus, the high- or low-beam signal of the head lamps 22 is transmitted from the combination switch multiplex node CS to the front multiplex node FN in accordance with the frame format shown in FIG. 5(b), and the on/off signals of the front turn signal lamps 6 and 7 are separately transmitted from the cluster switch multiplex node CN to the front multiplex node FN in accordance with the frame format shown in FIG. 5(c). In the model B, the signals are produced by different multiplex nodes, and therefore, they are transmitted by means of two different frames having their data areas assigned with the respective signals.

With conventional frame formats, however, signal allocation in the data area must be changed depending on the model and grade of vehicles, and therefore, the individual frame formats must be modified. That is, depending on the model and grade of vehicles, the assignment of all the signals to the frame ID and the data area must be determined, thus causing an increase in load of development of multiplex transmission systems and in cost.

OBJECT AND SUMMARY OF THE INVENTION

An object of the present invention is to provide a multiplex transmission system which need not be modified depending on the model and grade of vehicles and can be used widely and applied to various options by using a signal allocation (assignment) system common to different models and grades of vehicles.

The present invention provides a multiplex transmission system, in which one of a plurality of nodes, as a transmission node, coupled together through a transmission path transmits a frame of data including a data area carrying transmission data, to other nodes, as reception nodes, through the transmission path.

The frame of data transmitted includes a data valid/invalid area which has the same bit length as the data area and indicates, bit by bit, the validness/invalidness of respective bits of the data area.

According to the invention, the rule for signal assignment to the data area need not be modified depending on the model and grade of vehicles, and the same signal allocation system can be applied to different system configurations by changing the codes of the necessary bits in the data valid/invalid area. Thus, the load on development of multiplex transmission systems can be reduced.

Preferably, the frame of data transmitted includes an identifier for indicating the content of the data area, and the data valid/invalid area can used as another data area by setting the value of the identifier to a predetermined value.

Furthermore, the data valid/invalid area can be used to detect the abnormality of frame data. Those bits of the data area which correspond to bits in the data valid/invalid area having values indicative of data invalidness are set to a fixed value, and when a bit of the data valid/invalid area in the received frame and the corresponding bit of the data area in the received frame make a combination of specific values, the transmission node is judged to be defective.

When the abnormality of the transmitted frame is detected, all the data in this frame may be disregarded, or an alarm may be issued to inform the abnormality.

According to the preferred embodiments of the invention, abnormality detection can be effected easily without the use of any special abnormality detection device, and the reliability of the multiplex transmission system can be improved.

The above and other objects, features and advantages of the invention will become apparent from the ensuing detailed description taken in conjunction with the accompanying drawings.

DETAILED DESCRIPTION

Figure 6:
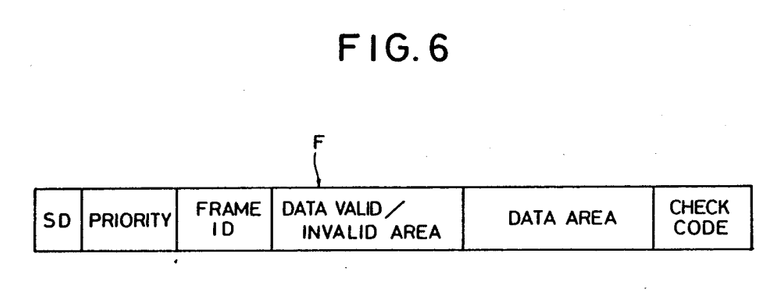
FIG. 6 is a diagram illustrating an example of frame format used in the multiplex transmission system of the present invention.

FIG. 6 shows an example of frame format used in the multiplex transmission system according to the present invention. This frame F is similar to the conventional one in that it includes the SD code, the priority code, the frame ID code, the data area, and the check code. However, as distinct from the conventional frame format, a "data valid/invalid" area is provided which precedes the data area. More specifically, the data valid/invalid area of the frame F, preceding the 16-bits (2-bytes) data area, is an area of 16-bits codes corresponding respectively to the zeroth to fifteenth bits of the data area for indicating the validness/invalidness of the corresponding data bits. That is, the zeroth to fifteenth bits of the data area correspond to the zeroth to fifteenth bits of the data valid/invalid area, respectively. If the zeroth bit of the data valid/invalid area is "0," for example, the data corresponding to the zeroth bit of the data area is invalid. Similarly, if the first bit of the data valid/invalid area is "1", the data corresponding to the first bit of the data area is valid. When the data is valid, the reception multiplex node operates ordinarily based on the data; however, if the data is invalid, the reception node disregards the data whatever the content of the bit may be, that is, the node makes no decision based on it. By thus providing the data valid/invalid area, the rule for signal assignment to the data area need not be modified depending on the model and grade of vehicles, and the common signal assignment (allocation) system can be applied to different system configurations by changing the codes of the necessary bits in the data valid/invalid area. Consequently, the signal assignment system need not be made for each vehicle model and/or grade. Moreover, the signal assignment table can be standardized so as to be commonly used in all the vehicle models, whereby the load on development of multiplex transmission systems can be reduced.

Figure 7A:
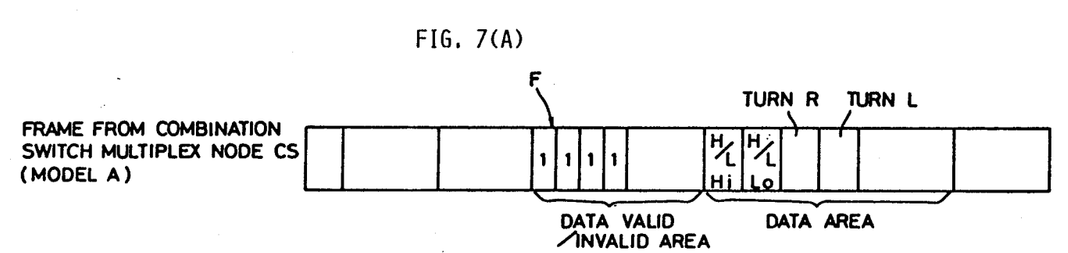
FIGS. 7(a), 7(b) and 7(c) are diagrams illustrating in detail the frame format shown in FIG. 6.
Figure 7B:
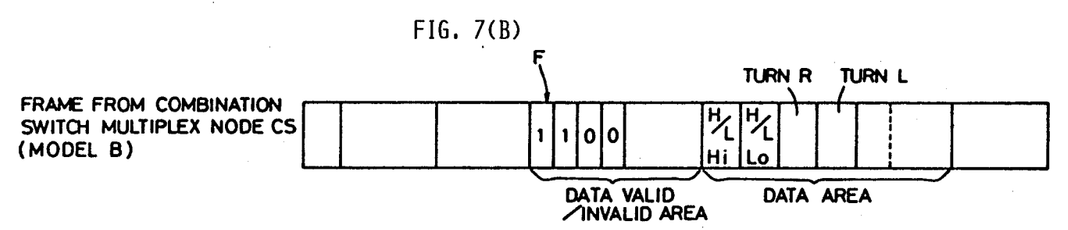
Figure 7C:
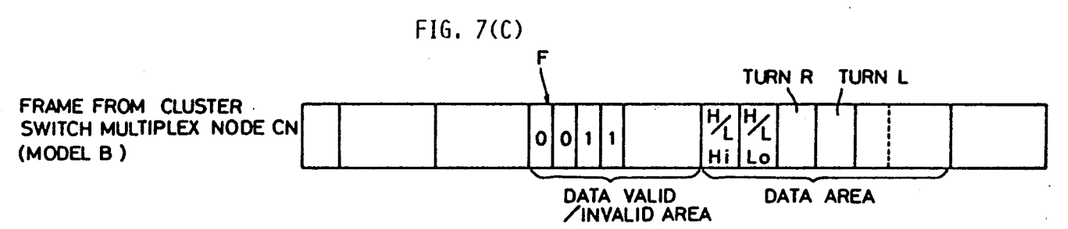

Now, the multiplex transmission system of the present invention will be described in more detail with reference to FIGS. 3, 4 and 7(a)-7(c). In the vehicle model A shown in FIG. 3, the combination switch multiplex node CS transmits a frame, whose data valid/invalid area has its bits set to "1111..." as shown in FIG. 7(a), to the front multiplex node FN. The front multiplex node FN receives the transmitted frame, while judging the data signals in the data area indicating the conditions of the head-lamp high beam switch, head-lamp low beam switch, turn-right switch and turn-left switch to be effective, and performs the necessary operation. On the other hand, in the vehicle model B shown in FIG. 4, the frame transmitted from the combination switch multiplex node CS to the front multiplex node FN includes the data valid/invalid area having its bits set to "1100..." as shown in FIG. 7(b). The front multiplex node FN judges the head lamp signals to be valid, but the turn signal-lamp signals to be invalid. The frame transmitted from the cluster switch node CN to the front multiplex node FN includes the data valid/invalid area which has its bits set to "0011..." as shown in FIG. 7(c). The front multiplex node FN, which has received this frame, judges the head lamp signals to be invalid and the turn signal-lamp signals to be valid.

Figure 8:
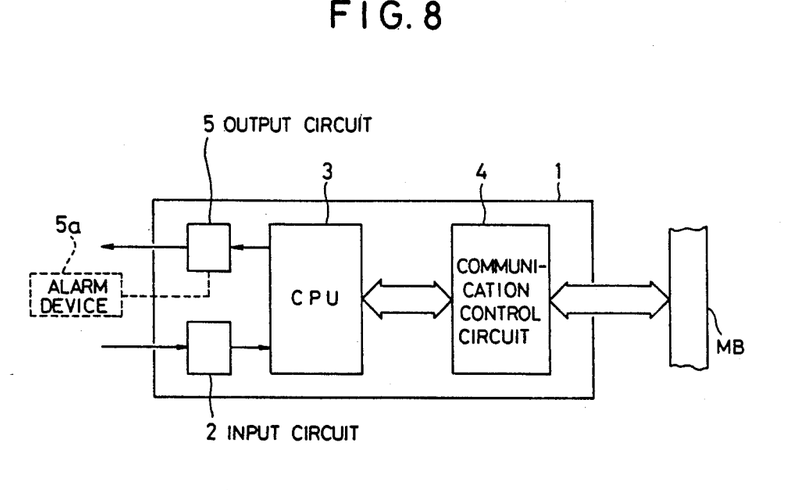
FIG. 8 is a block diagram illustrating the circuit arrangement of a node used in the multiplex transmission system.

FIG. 8 is a block diagram illustrating the circuit arrangement of a multiplex node 1 used in the multiplex transmission system. The detection signals from various sensors in the vehicle and the on/off signals from various switches are applied to an input circuit 2, which in turn supplies the various input signals to a central processing unit (CPU) 3. The CPU 3 processes the input signals, and supplies those signals that should be transmitted, to a communication control circuit 4 in the form of a data sequence within the frame mentioned above. The communication control circuit 4 generates an error check code and adds it to the data supplied thereto, thereby putting the data into final form (frame F). The circuit 4 encodes the frame F as needed, in accordance with the CSMA/CD control, and sends it to the multiplex transmission path MB. In the multiplex node 1 on the receiving side, on the other hand, the communication control circuit 4 receives the frame F from the multiplex transmission path MB and decodes it as needed. The circuit 4 then checks the received data by means of the error check code etc. and, if no data error is detected, transfers the data to the CPU 3. The CPU 3 determines whether the received frame F contains data necessary to this multiplex node, based on the values of the bits in the ID code of the frame F. Thus, each reception multiplex node accepts for use or disregards the received frame by checking the ID code. The data necessary to the node is processed, and the processed data is output to an output circuit 5.

Figure 9:
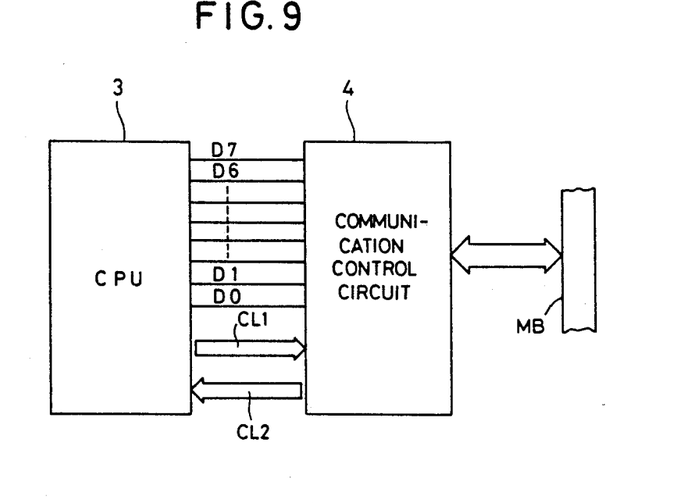
FIGS. 9, 10 and 11 are block diagrams each illustrating the data transmission between a CPU 3 and a communication control circuit 4 appearing in FIG. 8.
Figure 10:
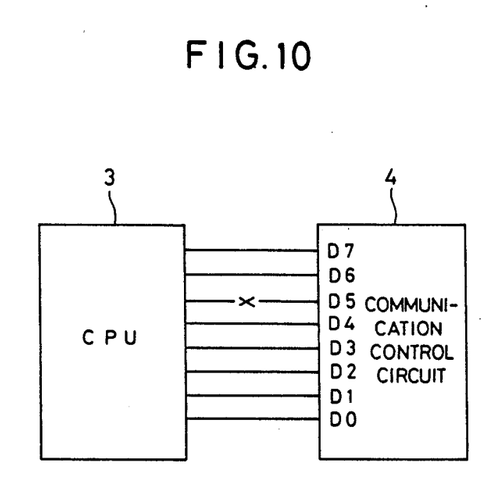
Figure 11:
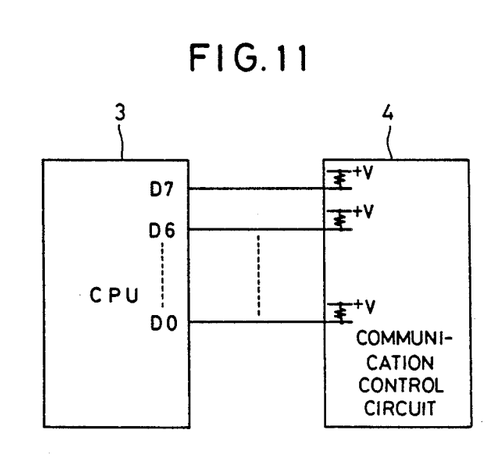
Figure 12A:
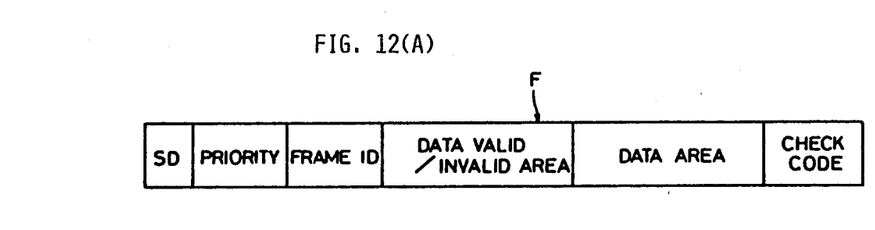
FIGS. 12(a) and 12(b) are diagrams for explaining the abnormality detection adopted in the multiplex transmission system of the invention.

FIG. 9 is a block diagram for illustrating the data transmission between the CPU 3 and the communication control circuit 4 both appearing in FIG. 8. The data is transmitted between the CPU 3 and the communication control circuit 4 through, e.g., 8 bi-directional data buses $D_0, D_1, \ldots D_7$, as shown in FIG. 9. To ensure proper data transmission, control lines CL1 and CL2 for transmitting clocks are usually provided to connect between the CPU 3 and the communication control circuit 4. The communication control circuit 4 can be constituted by a single-chip large scale integrated (LSI) circuit, and an LSI circuit is mostly used for the purpose of miniaturization. In the arrangement of FIG. 9, the bi-directional data buses $D_0$–$D_7$ and the control lines CL1 and CL2 serve as the wiring connecting the communication control circuit 4 to the outside. If the multiplex node 1 is formed on a printed circuit board, a disadvantage can arise in that the connection between the wiring pattern and the CPU 3 or the LSI constituting the communication control circuit 4 becomes defective during the manufacture. Let it be assumed that such connection defectiveness occurs in the bi-directional data buses $D_0$–$D_7$, for example, the bi-directional data bus $D_5$ is disconnected, as shown in FIG. 10. The bi-directional data buses are pulled up by the power source inside the LSI constituting the communication control circuit 4, and a frame of data, shown in FIG. 12(a), is supplied from the CPU 3 and written, byte by byte, in the LSI of the circuit 4 in the order of the priority, frame ID, data valid/invalid, and data. The starting delimiter SD and the check code are added in the communication control circuit 4.

TABLE 1

|  | Data Written By CPU 3 | Recognition By Communication Control Circuit 4 |
| --- | --- | --- |
| Priority | 00010100 | 00110100 (34H) |
| Frame ID | 10001110 | 10101110 (AEH) |
| Data Valid/Invalid | 11111111 | 11111111 (FFH) |
| Data | 00010000 | 00110000 (30H) |

Note: The data valid/invalid area and the data area both employ positive logic.

TABLE 1 illustrates the case where the data valid/invalid area and the data area both employ positive logic in an ordinary multiplex transmission system. Let it be assumed that a frame is transmitted from the CPU 3 to the communication control circuit 4, the priority code of the frame is "14H," the frame ID code is "8EH," the data is all valid, the data in the data valid/invalid area indicates "OFFH," and that the data in the data area indicates "10H." If, in this case, the bi-directional data bus $D_5$ is disconnected as shown in FIG. 10, the communication control circuit 4 recognizes the contents of the priority, frame ID, data valid/invalid area, and data area respectively as "34H," "OAEH," "OFFH" and "30H" since the data bus is pulled up therein. The data corresponding to the bi-directional data bus $D_5$ is effective and active, and accordingly is not recognized as abnormal. The frame is therefore transmitted to the multiplex transmission path MB, like normal frame F. As a result, the data whose frame ID is "34H" and which designates the functions corresponding the fourth and fifth bits is sent to the multiplex transmission path MB, and is received by some multiplex node which is driven in accordance with the data. Thus, malfunction of the multiplex transmission system is caused.

As a countermeasure to overcome the disadvantage, a method may be employed in which the error check code is generated by the CPU 3, not by the communication control circuit 4, for the checking of the data. More specifically, in transmitting data, the CPU 3 of the transmission multiplex node calculates based on the data of the priority, frame ID, data valid/invalid area and data area, to generate an error check code consisting, for example, of 1 byte, and transmits the data from the priority to the check code to the communication control circuit 4 in accordance with the format of the frame F. In the multiplex node of the receiving side, all the data of the 5-bytes frame F is transmitted from the communication control circuit 4 to the CPU 3. The CPU 3 calculates based on the error check code, to detect an error in the received data. This method, however, necessarily entails an increase of the load on software of the CPU 3, and therefore, difficulty will possibly be caused in the control function of the CPU 3.

In the case of using a method in which an ACK signal is returned as a reception response when the received data is correct, and an NACK signal is returned and data re-transmission is requested when the received data is not correct, the responsiveness of the overall system is lowered since the error check is made by the CPU 3 by using software. Further, the priority data is in itself not the necessary data for the CPU 3 on the receiving side, and therefore may be or may not be transmitted to the CPU 3 from the communication control circuit 4. When the error check is made in the CPU 3, however, the priority data must be transmitted to the CPU 3. This results in an increase of load on the CPU 3 and causes degradation in responsiveness of the system.

Figure 12B:
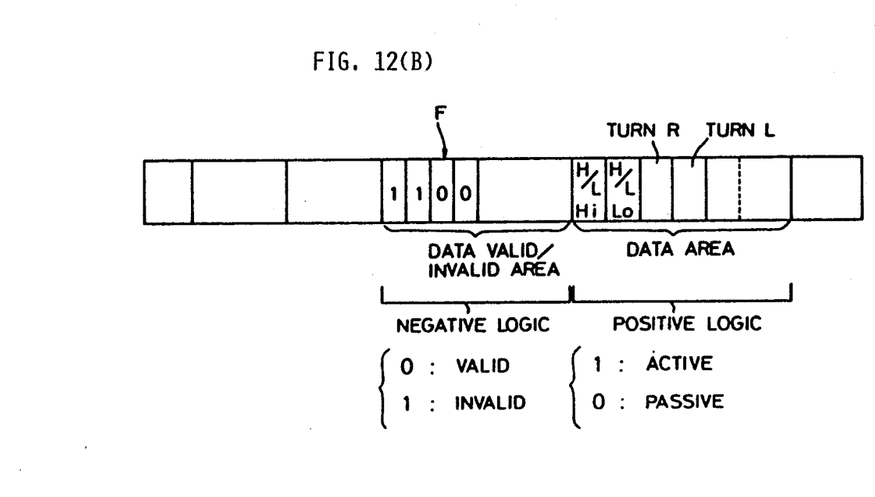

To eliminate the disadvantages, according to a preferred embodiment of the invention, the bits of the data valid/invalid area and those of the data area are set such that the combination of their corresponding bits is (1,1) or (0,0) when abnormality occurs, so as to detect the abnormality of multiplex nodes for prevention of malfunction of the system and, as needed, to give an alarm indicating the abnormality. More specifically, negative logic is employed in the data valid/invalid area while positive logic is employed in the data area, for example, so that the combination of the corresponding bits may be an unusual logical pattern (1,1) that cannot take place in normal conditions. Such unusual logical pattern is detected to avoid the malfunction of the system. If, as shown in FIG. 12(b), negative logic is employed in the data valid/invalid area while positive logic is employed in the data area, "0" indicates validness while "1" indicates invalidness in the data valid/invalid area, whereas in the data area, "1" is active and "0" is passive. Those bits of the data area which correspond to the invalid bits in the data data valid/invalid area usually need not be manipulated and can be fixed at "0" or "1." In this example, however, if the data bits corresponding to the invalid bits are set to be passive (in this case "0") all the time, the invalid bits in the data valid/invalid area are "1" and the corresponding data bits cannot be active or "1" during normal conditions.

TABLE 2

|  | Data Written By CPU 3 | Recognition By Communication Control Circuit 4 |
| --- | --- | --- |
| Priority | 00010100 | 00110100 (34H) |
| Frame ID | 10001110 | 10101110 (AEH) |
| Data Valid/Invalid | 00000000 | 00100000 (20H) |
| Data | 00010000 | 00110000 (30H) |

Note: The data valid/invalid area employs negative logic and the data area employs positive logic.

Assuming that, as shown in TABLE 2, the priority data is "14H," the frame ID data is "8EH," the bits of the data valid/invalid area all indicate validness (in this case, "00H" since negative logic is employed), and the data is "10H," if the bi-directional data bus $D_5$ is disconnected as shown in FIG. 10, the data changes as it is transmitted from the CPU 3 to the communication control circuit 4. The communication control circuit 4 judges that the priority data "34H," the frame ID data "0AEH," the data valid/invalid area data "20H" and data "30H" have been written, and sends the erroneous data as a frame F to the multiplex transmission path MB with the check code and the starting delimiter SD added to the frame. When the multiplex node 1 on the receiving side receives the frame F, the priority data in the frame F is not transmitted to the CPU 3 from the communication control circuit 4, with the result that "0AEH," "20H" and "30H" are received as the data of the frame ID, data valid/invalid area and data area, respectively. The combination of the fifth bits in the data valid/invalid area and the data area is (1,1) which is improbable. Thus, it can be concluded that the data is not correctly received, for example, due to the disconnection of the data bus corresponding to the fifth bit, noises produced during the data transmission, etc. When the reception data is detected to be incorrect, the CPU 3 disregards the data without using it for control. In this manner, it is possible to prevent erroneous data from being transmitted to the outside of the multiplex node 1 and malfunction of other nodes.

In the case where an alarm is to be issued in response to the detection of abnormality of a multiplex node, an alarm device 5a may be driven via the output circuit 5 of the meter multiplex node, as indicated by the broken line in FIG. 8.

When a frame including the aforementioned improbable logical pattern is received, it can be judged that abnormality has occurred somewhere in the the multiplex transmission system, though its location is not specified. Therefore, by providing each multiplex node with an algorithm which determines that the multiplex node associated therewith is defective when abnormality is detected a predetermined number of times on end, and which determines that another node is defective when abnormality is detected intermittently a predetermined number of times, such information may be delivered to the outside to request inspection and/or repair of defective parts, whereby the reliability of the system can be improved.

In the case where the bi-directional data buses are pulled down in the communication control circuit 4, similar abnormality detection can be achieved by using positive logic in the data valid/invalid area and negative logic in the data area. Further, in the case of prescribing those bits of the data area in the frame F corresponding to invalid bits in the data valid/invalid area to be active and fixed, the logical pattern (1,1) or (0,0) which is improbable for the data valid/invalid area and the data area during normal conditions may be used, whereby similar abnormality detection can be achieved.

Figure 13A:
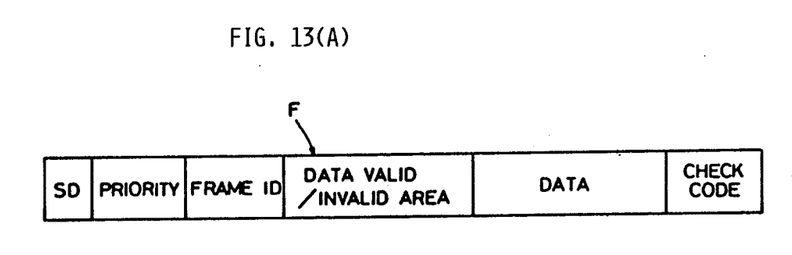
FIGS. 13(a), 13(b) and 13(c) are diagrams illustrating a frame format for designating the presence/absence of a data valid/invalid area in the frame by means of a frame ID.
Figure 13B:
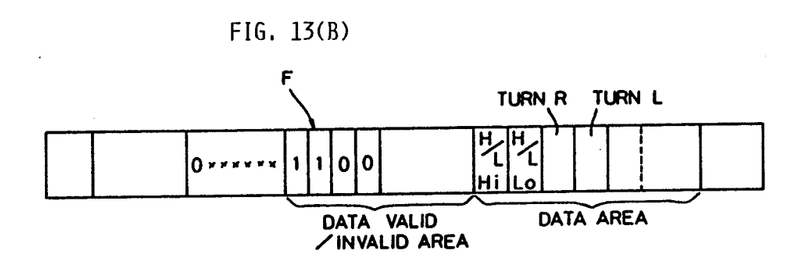
Figure 13C:
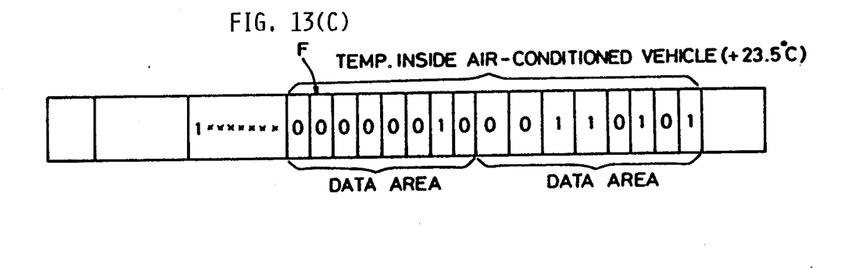

Furthermore, in a multiplex transmission system for vehicles wherein the control unit for an air conditioner constitutes a multiplex node and the temperature inside the vehicle is subjected to BCD coding for transmission, the length of data may be of several bytes, unlike the switch signals. In this case, the nodes which will transmit such data signals are specified, and it is hardly probable that the same data signal is transmitted from a plurality of nodes. In view of this, the MSB (most significant bit) of the frame ID may be used such that the data valid/invalid area indicates the validness/invalidness of the respective bits in the data area, as described above, when the MSB of the frame ID is "0," for example, and both the data valid/invalid area and the data area are used to carry data when the MSB of the frame ID is "1," as shown in FIG. 13(a).

What is claimed is:

1. A multiple transmission system having a plurality of nodes including at least one transmission node coupled through a transmission path to transmit a frame of data therethrough to a plurality of reception nodes, comprising:
   a transmitter circuit including
     (a) means for providing a data area of a given bit length as a portion of said frame of data;
     (b) means for providing a data valid/invalid area as another portion of said frame of data, said data valid/invalid area having the same bit length as said given bit length of the data area, and the bits in the data valid/invalid area, respectively, setting the valid/invalid state of the bits in the data area;
   each of said reception nodes comprising means responsive to said frame of data for actuating an operation corresponding to the content of said frame of data; and
   means for detecting when an abnormality is present in a received frame of data, and for determining that all the data in said received frame is invalid.

2. A multiple transmission system having a plurality of nodes including at least one transmission node coupled through a transmission path to transmit a frame of data therethrough to a plurality of reception nodes, comprising:
   a transmitter circuit including
     (a) means for providing a data area of a given bit length as a portion of said frame of data;
     (b) means for providing a data valid/invalid area as another portion of said frame of data, said data valid/invalid area having the same bit length as said given bit length of the data area, and the bits in the data valid/invalid area, respectively, setting the valid/invalid state of the bits in the data area;
   each of said reception nodes comprising means responsive to said frame of data for actuating an operation corresponding to the content of said frame of data; and
   means for, when an abnormality is detected in a received frame of data, issuing an alarm for indicating the invalidity of the data in said received frame of data.

3. In a multiplex transmission system, wherein one of a plurality of nodes, as a transmission node, is coupled through a transmission path to other nodes, as reception nodes, and transmits a frame of data through said transmission path, a transmitter circuit comprising:
   means for providing a data area of a given bit length as a portion of said frame of data;
   means for providing a data valid/invalid area as another portion of said frame of data, said data valid/invalid area having the same bit length as said given bit length of the data area, and the bits in the data valid/invalid area, respectively, setting the valid/invalid state of the bits in the data area;
   means for providing an identifier to form a portion of said frame of data for indicating the content of said data area; and
   means for using said data valid/invalid area as another data area when the value of said identifier is set to a predetermined value.

4. In a multiplex transmission system, wherein one of a plurality of nodes, as a transmission node, is coupled through a transmission path to other nodes, as reception nodes, and transmits a frame of data through said transmission path, a method comprising the steps of:
   providing a data area of a given bit length as a portion of said frame of data;
   providing a data valid/invalid area as another portion of said frame of data, said data valid/invalid area having the same bit length as said given bit length of the data area, and the bits in the data valid/invalid area, respectively, setting the valid/invalid state of the bits in the data area;
   providing an identifier to form a portion of said frame of data for indicating the content of said data area; and
   using said data valid/invalid area as another data area when the value of said identifier is set to a predetermined value.

5. A multiple transmission system having a plurality of nodes including at least one transmission node coupled through a transmission path to transmit a frame of data therethrough to a plurality of reception nodes, comprising:
   a transmitter circuit including
     (a) means for providing a data area of a given bit length as a portion of said frame of data;
     (b) means for providing a data valid/invalid area as another portion of said frame of data, said data valid/invalid area having the same bit length as said given bit length of the data area, and the bits in the data valid/invalid area, respectively, setting the valid/invalid state of the bits in the data area; and
     (c) means for transmitting from said transmission node a frame of data in which those bits of said data area which correspond respectively to bits in said data valid/invalid area having values indicative of data invalidity are set to a fixed value; and
   each of said reception nodes comprising means responsive to said frame of data for actuating an operation corresponding to the content of said frame of data, said responsive means in each of said reception nodes includes means for finding the transmission node to be defective when a bit of the data valid/invalid area in the received frame of data and the corresponding bit of the data area in the received frame of data make a combination of a specific value.

6. In a multiple transmission system having a plurality of nodes including at least one transmission node coupled through a transmission path to transmit a frame of data therethrough to a plurality of reception nodes, a method comprising the steps of:
   at a transmission node,
     (a) providing a data area of a given bit length as a portion of said frame of data;
     (b) providing a data valid/invalid area as another portion of said frame of data, said data valid/invalid area having the same bit length as said given bit length of the data area, and the bits in the data valid/invalid area, respectively, setting the valid/invalid state of the bits in the data area;
     (c) setting to a fixed value those bits of said data area which correspond, respectively, to bits in said data valid/invalid area having values indicative of data invalidity; and
     (d) transmitting a frame of data therefrom with the fixed value bits included therein; and
   at each of said reception nodes, responding to said frame of data for actuating an operation corresponding to the content of said frame of data, and finding the particular transmission node to be defective when a bit of the data valid/invalid area in the frame of data received therefrom and the corresponding bit of the data area in the received frame of data make a combination of a specific value.

7. In a multiple transmission system having a plurality of nodes including at least one transmission node coupled through a transmission path to transmit a frame of data therethrough to a plurality of reception nodes, a method comprising the steps of:

at a transmission node,
  (a) providing a data area of a given bit length as a portion of said frame of data;
  (b) providing a data valid/invalid area as another portion of said frame of data, said data valid/invalid area having the same bit length as said given bit length of the data area, and the bits in the data valid/invalid area, respectively, setting the valid/invalid state of the bits in the data area; and at each of said reception nodes, responding to said frame of data for actuating an operation corresponding to the content of said frame of data, detecting when an abnormality is present in a received frame of data, and determining that all the data in said received frame of data is invalid.

8. In a multiple transmission system having a plurality of nodes including at least one transmission node coupled through a transmission path to transmit a frame of data therethrough to a plurality of reception nodes, a method comprising the steps of:

at a transmission node,
  (a) providing a data area of a given bit length as a portion of said frame of data;
  (b) providing a data valid/invalid area as another portion of said frame of data, said data valid/invalid area having the same bit length as said given bit length of the data area, and the bits in the data valid/invalid area, respectively, setting the valid/invalid state of the bits in the data area; and at each of said reception nodes, responding to said frame of data for actuating an operation corresponding to the content of said frame of data, and when an abnormality is detected in a received frame of data, issuing an alarm for indicating the invalidity of the data in said received frame of data.

* * * * *